US009203516B2

(12) United States Patent  
Moore et al.

(10) Patent No.: US 9,203,516 B2  
(45) Date of Patent: *Dec. 1, 2015

(54) INTELLIGENT BAIL

(71) Applicant: Finisar Corporation, Sunnyvale, CA (US)

(72) Inventors: Joshua Moore, Collingwood (CA); Greta Light, San Mateo, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/966,090

(22) Filed: Aug. 13, 2013

(65) Prior Publication Data

US 2014/0205298 A1 Jul. 24, 2014

Related U.S. Application Data

(63) Continuation of application No. 12/116,327, filed on May 7, 2008, now Pat. No. 8,525,649.

(60) Provisional application No. 61/045,956, filed on Apr. 17, 2008.

(51) Int. Cl.
| | |
|---|---|
| *H04Q 5/22* | (2006.01) |
| *G02B 6/36* | (2006.01) |
| *H04B 10/2575* | (2013.01) |
| *H04Q 9/00* | (2006.01) |
| *G02B 6/38* | (2006.01) |
| *H04B 10/40* | (2013.01) |
| *G02B 6/42* | (2006.01) |

(52) U.S. Cl.
CPC .......... *H04B 10/2575* (2013.01); *G02B 6/3895* (2013.01); *G02B 6/4292* (2013.01); *H04B 10/40* (2013.01); *H04Q 9/00* (2013.01); *G02B 6/4284* (2013.01)

(58) Field of Classification Search
None
See application file for complete search history.

(56) References Cited

U.S. PATENT DOCUMENTS

| | | | |
|---|---|---|---|
| 3,977,104 A | 8/1976 | Stupar | |
| 5,473,715 A | 12/1995 | Schofield et al. | |
| 5,764,043 A | 6/1998 | Czosnowski et al. | |
| 6,002,331 A * | 12/1999 | Laor | 340/539.1 |
| 6,430,053 B1 | 8/2002 | Peterson et al. | |
| 6,574,586 B1 | 6/2003 | David et al. | |
| 6,802,735 B2 | 10/2004 | Pepe et al. | |
| 7,351,090 B1 | 4/2008 | Moore | |
| 2007/0013487 A1 | 1/2007 | Scholtz | |
| 2008/0100467 A1 * | 5/2008 | Downie et al. | 340/686.2 |

* cited by examiner

Primary Examiner — Fekadeselassie Girma  
Assistant Examiner — John Bamert  
(74) Attorney, Agent, or Firm — Maschoff Brennan (57) ABSTRACT

An identification device is configured to be coupled externally to an optoelectronic device to provide connectivity and/or identification information in an optical network in which the optoelectronic device is implemented. The identification device may include an integrated circuit with unique identification information and a plurality of contacts coupled to the integrated circuit and configured to be coupled to an outside identification system. The outside identification system communicates with the identification device via the plurality of contacts to collect unique identification information, the ability to retrieve the unique identification information additionally implicating connectivity in some embodiments. The identification device may include a plurality of clips configured to engage corresponding posts on a latch of the optoelectronic device.

18 Claims, 9 Drawing Sheets

FIG. 5A

INTELLIGENT BAIL

CROSS-REFERENCE TO RELATED APPLICATIONS

This patent application is a continuation of U.S. patent application Ser. No. 12/116,327, filed May 7, 2008, which claims the benefit of and priority to U.S. Provisional Patent Application Ser. No. 61/045,956, filed Apr. 17, 2008. The foregoing applications are herein incorporated by reference.

BACKGROUND OF THE INVENTION

1. The Field of the Invention

The present invention relates generally to optoelectronic communication devices. More particularly, embodiments of the present invention relate to identification devices that can be mounted externally to optoelectronic devices to provide connectivity and/or identification information for the optoelectronic devices.

2. The Relevant Technology

Computing, telecom and networking technology have transformed our world. As the amount of information communicated over networks has increased, high speed transmission has become ever more critical. Many high speed data transmission networks rely on optoelectronic devices, including transceivers and transponders, for facilitating transmission and reception of digital data embodied in the form of optical signals over optical fibers. Optical networks are thus found in a wide variety of high speed applications ranging from modest Local Area Networks ("LANs") to backbones that define a large portion of the infrastructure of the Internet.

Typically, data transmission and reception in such networks is implemented by way of an optoelectronic device that includes an optical transmitter for data transmission and an optical receiver for data reception. The optical transmitter may emit optical data signals over one optical fiber while the optical receiver receives optical data signals over another optical fiber. Optoelectronic devices may be implemented in junctions, patch panels, and other connections where multiple optical fibers are coupled to multiple optoelectronic devices in a single, confined area. In such an environment, it may be advantageous for network administrators to be able to uniquely identify each optical fiber endpoint and the optoelectronic devices to which the optical fiber endpoints are (or should be) coupled. This allows the network administrators to easily replace and/or repair particular optical fibers and/or optoelectronic devices without inadvertently disconnecting a properly functioning connection.

One potential solution to this problem is for optoelectronic device manufacturers to integrate an integrated circuit or other chip with unique identification information internal to each optoelectronic device which can be read by an external or outside identification system collecting connectivity and/or identification information from the entire network. However, optoelectronic device manufacturers may be reluctant to implement this approach as each third party vendor that distributes a given manufacturer's optoelectronic devices may have very detailed requirements with respect to the devices they distribute for the manufacturer, and any changes to the optoelectronic devices may be subject to a typically long vendor qualification process. Additionally, outside identification systems may require the unique identification information to be presented at the front or line side of the optoelectronic devices and it can be quite difficult to provide line-side electrical contacts for the internal integrated circuit. Furthermore, an internal integrated circuit with identification information would be difficult, if not impossible, to implement in legacy optoelectronic devices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

These and other limitations are overcome by embodiments of the invention, which relate to devices, systems and methods for providing connectivity and/or identification information in optical networks. More particularly, embodiments of the invention relate to an identification device with unique identification information that can be coupled to the exterior line side of an optoelectronic device or module. Advantageously, embodiments of the invention can be implemented without the difficulty of providing line side electrical connections to enable optoelectronic devices with internal identification integrated circuits, and without subjecting the optoelectronic devices to a vendor qualification process. Furthermore, embodiments of the invention enable identification information to be collected from legacy, as well as new, optoelectronic devices.

According to one embodiment of the invention, an identification device includes an integrated circuit programmed with or containing unique identification information. The unique identification information may uniquely identify the identification device itself and/or an optoelectronic device to which the identification device is attached. The identification device may additionally include a plurality of contacts communicably coupled to the integrated circuit and configured to be coupled to an external or outside identification system (or more particularly, to corresponding contacts of an external or outside identification system). The plurality of contacts enable the external or outside identification system to retrieve or read the unique identification information from the integrated circuit. The identification device may additionally include coupling means for coupling the identification device external to, and at the line side of, an optoelectronic device.

According to another embodiment of the invention, an identification device includes an integrated circuit programmed with unique identification information and a radio frequency antenna configured to power the integrated circuit. For instance, incoming radio frequency signals may induce a current in the radio frequency antenna sufficient to power the integrated circuit to emit, via the radio frequency antenna, the unique identification information to an external identification system. The identification device may additionally include coupling means for coupling the identification device external to, and at the line side of, an optoelectronic device.

The coupling means may include one or more clips, screws, adhesives, or other fasteners configured to engage a latch, bail, cavity, protrusion, or other features of an optoelectronic device to which the identification device is to be attached. For instance, in one embodiment the optoelectronic device includes a latch with two posts, one on each side of the latch. In this embodiment, the coupling means may include two clips configured to engage the two posts of the latch.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to methods, systems, and devices for providing identification of optoelectronic communication devices in an optical network. Embodiments of the invention include identification devices that can be externally coupled to the front or line side of the optoelectronic devices to provide identification and connectivity information for an optical network in which the optoelectronic devices are implemented. Advantageously, the identification devices can be added to the optoelectronic devices in the factory or as aftermarket add-ons, enabling the collection of identification and connectivity information from virtually any optoelectronic devices, including legacy and new devices. Furthermore, the identification devices enable the collection of identification and connectivity information without the difficulty of bringing line side contacts through the optoelectronic devices.

The present invention can be implemented in various optoelectronic devices or modules. As used herein, the terms "optoelectronic device" and "optoelectronic module" are interchangeable and include devices having both optical and electrical components. Examples of optoelectronic devices include, but are not limited to transponders, transceivers, transmitters, and/or receivers. Optoelectronic devices can be used, for instance, in telecommunications networks, local area networks, metro area networks, storage area networks, wide area networks, and the like.

Optoelectronic devices according to embodiments of the invention can be configured for optical signal transmission and reception at a variety of per-second data rates including, but not limited to, 1 Gbit, 2 Gbit, 2.5 Gbit, 4 Gbit, 8 Gbit, 10 Gbit, or higher. Furthermore, the optoelectronic devices can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic devices can be configured to support various transmission standards including, but not limited to, Fast Ethernet, Gigabit Ethernet, 10 Gigabit Ethernet, and 1×, 2×, 4×, and 10× Fibre Channel. In addition, although one example embodiment of an optoelectronic device is configured to have a form factor that is substantially compliant with the enhanced small form-factor pluggable (SFP+) multi-source agreement (MSA), optoelectronic devices according to the invention can alternatively be configured to have a variety of different form factors that are substantially compliant with other MSAs including, but not limited to, the small form-factor (SFF) MSA or the small form-factor pluggable (SFP) MSA.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

Figure 1:
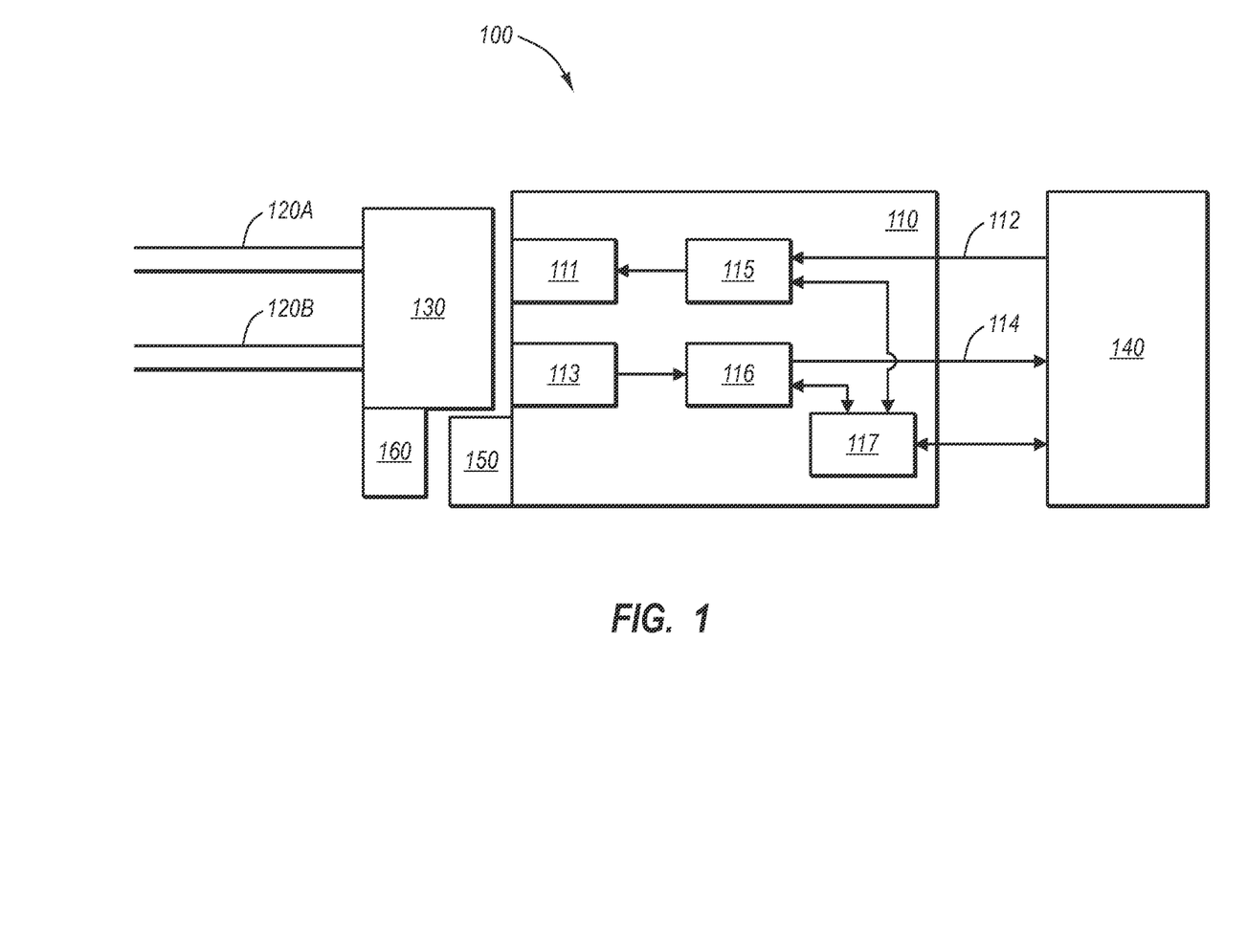
FIG. 1 illustrates one embodiment of an example operating environment in which embodiments of the invention may be implemented.

Reference is first made to FIG. 1, which schematically illustrates an example operating environment 100 in which embodiments of the invention can be practiced. As a preliminary note, the example operating environment is not drawn to scale. Furthermore, some of the components are illustrated abstractly and are not necessarily the shape that is illustrated. Moreover, while the example operating environment 100 will be described in some detail, it will be appreciated by one of ordinary skill in the art, with the benefit of the present disclosure, that the operating environment 100 is described by way of example only, and should not be construed to limit the invention.

The operating environment 100 includes an optoelectronic transceiver (or transponder) module 110, optical media 120A and 120B (collectively referred to herein as "optical media 120"), optical connector 130, and a host 140.

The transceiver 110 includes a transmitter optical subassembly ("TOSA") 111 with an optical transmitter configured to emit optical data signals representative of electrical data signals 112 received from the host 140 onto optical medium 120A, which may comprise fiber optic cable. A receiver optical subassembly ("ROSA") 113 with an optical receiver is configured to receive optical data signals from the optical medium 120B and convert them to electrical data signals 114 for the host 140. The transceiver may additionally include one or more integrated circuits ("ICs"), such as a laser driver 115, post amplifier 116, and microcontroller 117, which may aid in the conversion of electrical signals to optical signals and vice versa, and/or in controlling/optimizing the performance of the transceiver 100. It will be appreciated by one of ordinary skill in the art, with the benefit of the present disclosure, that the illustrated and described optoelectronic module architecture 110 is only one of countless transceiver or transponder architectures with which embodiments of the invention may be implemented.

The optical connector 130 is configured to removably couple the fiber optic cables 120A and 120B to the transceiver 110 and to align the fiber optical cables 120A and 120B with the TOSA 111 and ROSA 113. The optical connector 130 may comprise any one of a variety of connectors, including, but not limited to, a Lucent or local connector (LC), a subscriber or standard connector (SC), or a ferrule connector (FC) style connector. The end of the transceiver 110 to which the connector 130 is coupled is known as the "front side" or "line side" of the transceiver. In a typical operating environment, the line side of the transceiver 110 may be exposed during normal operation to receive the optical connector 130, while the rest of the transceiver may be almost completely surrounded by a cage within the host 140.

To facilitate the collection of connectivity and/or identification information in the operating environment 100, an identification device or module 150 may be coupled to the transceiver 110, typically at the line side. As will be described below, the identification module 150 may be attached in the factory or in the field, enabling the collection of connectivity and/or identification information from previously deployed legacy transceivers (or transponders). The identification device 150 is configured to communicate with an outside or external identification system and includes an integrated circuit that stores unique identification information, such as a unique serial number or other identifier. Alternately or additionally, the identification device 150 may be programmed with identification information corresponding to the transceiver 110, and/or additional information (e.g., operating parameters of the transceiver 110, or the like). The integrated circuit used to store the identification information may comprise any non-volatile memory/storage, including, but not limited to FLASH memory, Electrically Erasable Programmable Read-Only Memory ("EEPROM"), a radio frequency identification ("RFID") integrated circuit, or the like or any combination thereof.

In the embodiment shown, the outside identification system includes an out-of-band ("OOB") communication device 160 coupled to the connector 130. The OOB communication device may include an RFID tag, comprising an IC and antenna, to allow the wireless transmission of connectivity and/or identification information to a network device of the outside identification system. In the embodiment shown, the OOB communication device 160 may optionally store its own unique identification information and be configured to communicate its unique identification information to the network device.

Additionally, the OOB communication device 160 may be configured to communicate its connection to, and the unique identification information of, the identification device 150 when the OOB device 160 is communicably coupled to the identification device 150. For instance, in one embodiment, the OOB communication device 160 includes an RFID tag comprising an IC with identification information for the OOB device 160 and an antenna, while the identification device 150 includes an IC with identification information for the identification device 150 and/or optoelectronic device 110. An incoming radio frequency signal emitted by the network device may induce an electrical current in the antenna of the OOB device's RFID tag, which powers up the IC of the OOB device's RFID tag and causes the IC to transmit a response (e.g., the identification information of the OOB device) to the network device via the antenna. When the connector 130 is coupled to the transceiver 110, the OOB device 160 may be communicably coupled to the identification device 150, allowing the OOB device 160 to additionally read the unique identification information from the identification device 150 and transmit it, along with its own unique identification information, in the response to the network device.

In some embodiments, the OOB device 160 may be unable to communicably couple to the identification device 150 unless the connector 130 is properly coupled to the transceiver module 110. Thus, the ability of the OOB device 160 to read and transmit the unique identification information of the identification device 150 may imply that there is connectivity between the optical fibers 120A, 120B through the connector 130 to the transceiver module 110. In this embodiment, the external communication system may detect the existence of the connection between the OOB device and the identification device by receiving the unique identification information from the OOB device (e.g., the OOB device cannot read and transmit the unique identification information unless a connection exists between the OOB device and the identification device). Further, the existence of this connection implicates connectivity between the optical connector and the optoelectronic device since the OOB device and the identification device cannot be communicably coupled to begin with unless the connector is properly inserted into corresponding optical ports of the transceiver module 110.

Alternately or additionally, the outside identification system may include a handheld device configured to communicate with the identification device 150. Alternately or additionally, the outside identification system may include a hardwired or wireless connection between the network device and the identification device 150. Alternately or additionally, the identification device 150 may be self-powered, allowing it to transmit its identification information to the network device without the assistance of an OOB device 160, a handheld device, or other wired or wireless connection.

Figure 2:
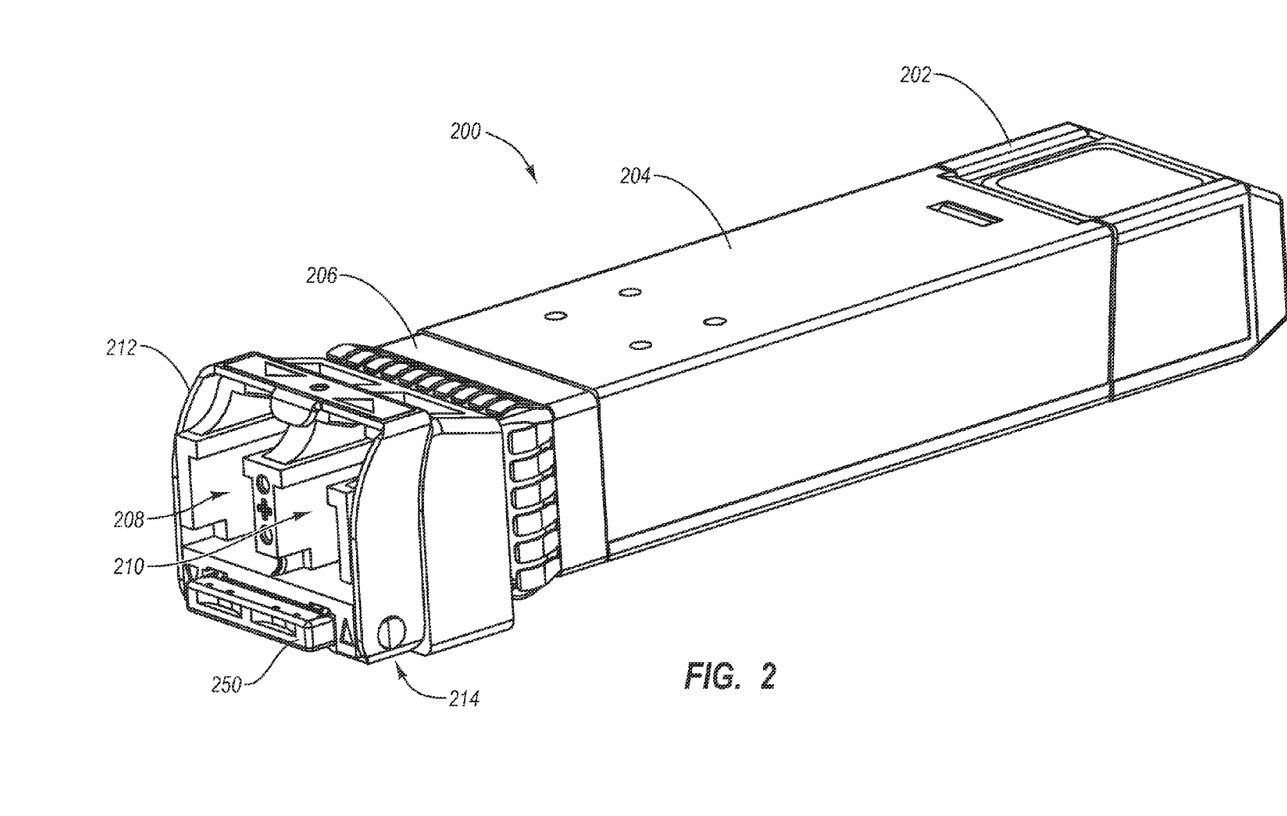
FIG. 2 illustrates one embodiment of an optoelectronic transceiver module and identification device attached to the optoelectronic transceiver module.

Turning now to FIGS. 2-5B, one particular embodiment of an identification device is illustrated that is configured to be coupled to the latch of an SFP+ transceiver. In particular, FIG. 2 illustrates a front perspective view of identification device 250 coupled to an SFP+ transceiver 200, both of which may correspond, respectively, to the identification device 150 and transceiver 110 illustrated in FIG. 1. The transceiver 200 includes an end cap 202, shell or housing 204, and electromagnetic interference (EMI) shield 206, all of which may mechanically and/or electrically support, protect and/or shield various components illustrated in FIG. 1, such as a TOSA, ROSA, laser driver, post amplifier, and/or microcontroller. Output and input ports 208, 210 are configured to receive a dual LC optical connector (not shown), which may correspond to one embodiment of the optical connector 130 of FIG. 1.

Additionally, the transceiver 200 includes a latching mechanism including a bail 212 (also shown as bail 404 and bail 564 in FIGS. 4A-5B) and latch 214 (illustrated as latch 402 and latch 562 in FIGS. 4A-5B), embodiments of which are disclosed in greater detail in U.S. Pat. No. 7,351,090 (referred to herein as the '090 patent), entitled LATCHING MECHANISM FOR A MODULE, which patent is herein incorporated by reference in its entirety. As will be described in greater detail below with respect to FIGS. 4A-4B, the identification device may be coupled to the latch 214.

Figure 3A:
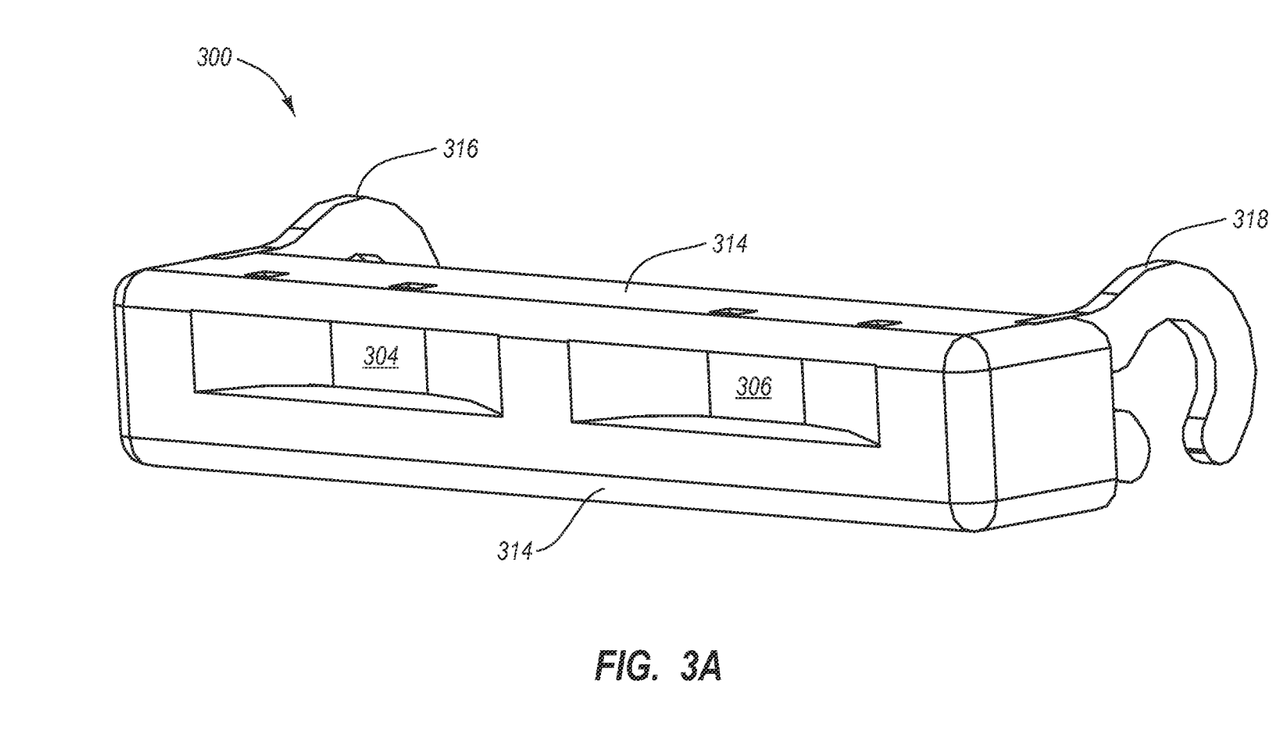
FIGS. 3A-3C illustrate various views of one embodiment of an identification device configured to be attached to a latch of the optoelectronic transceiver module of FIG. 2.
Figure 3B:
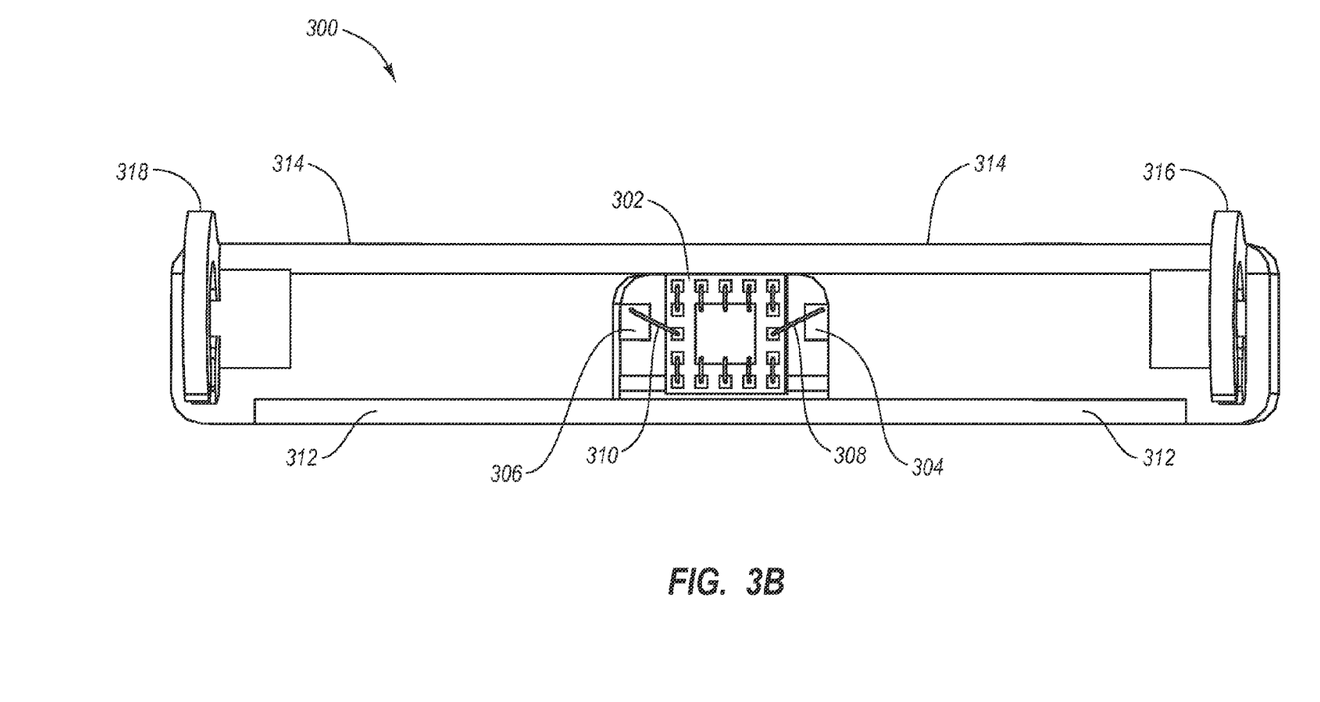
Figure 3C:
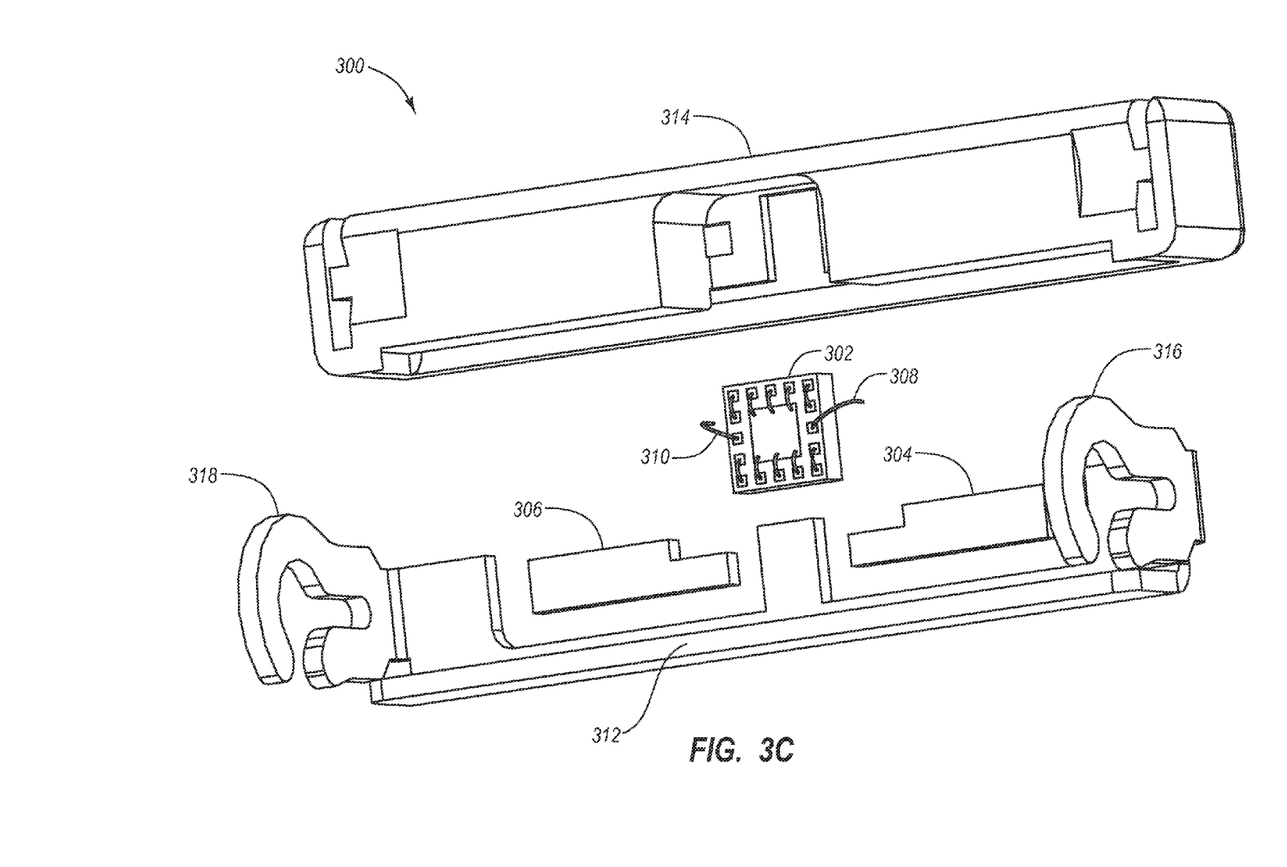

FIGS. 3A-3C illustrate, respectively, a front perspective view, a rear view, and a rear perspective exploded view of an identification device 300, which may correspond to the identification devices 150 and 250 of FIGS. 1 and 2. As shown, the identification device 300 includes an integrated circuit or (integrated circuit die package) 302 configured to store unique identification information which can be provided to an outside system, and a plurality of contacts 304, 306 communicably coupled to the integrated circuit 302 and configured to be communicably coupled to corresponding contacts of an outside identification system. The contacts 304, 306 may be communicably coupled to the integrated circuit 302 via leads 308, 310, for example.

Additionally, the identification device 300 may include a frame 312 configured to provide structural support for the identification device 300, as well as an overmolded body 314 configured to at least partially enclose, protect, and/or mechanically support the integrated circuit 302 and contacts 304, 306. In one embodiment, the overmolded body 314 is molded over the frame 312 and contacts 304, 306 and includes a cavity configured to receive the integrated circuit during assembly. The frame 312 includes coupling means 316, 318 for coupling the identification device 300 to the line side of an optoelectronic device. As shown, the coupling means 316, 318 include clips configured to couple the identification device 300 to the latch of an SFP+ transceiver such as illustrated in FIGS. 2 and 4A-5B. Alternately or additionally, the coupling means may include one or more clips, screws, adhesives, fasteners, or other coupling means configured to engage any external feature (e.g., post, latch, bail, cavity, protrusion, or the like) of an optoelectronic transceiver or transponder and thereby couple the identification device 300 to the optoelectronic transceiver or transponder.

Although not shown, an epoxy or other material may be used to backfill over the integrated circuit 302 to secure and protect it within a cavity of the overmolded body 314.

Figure 4A:
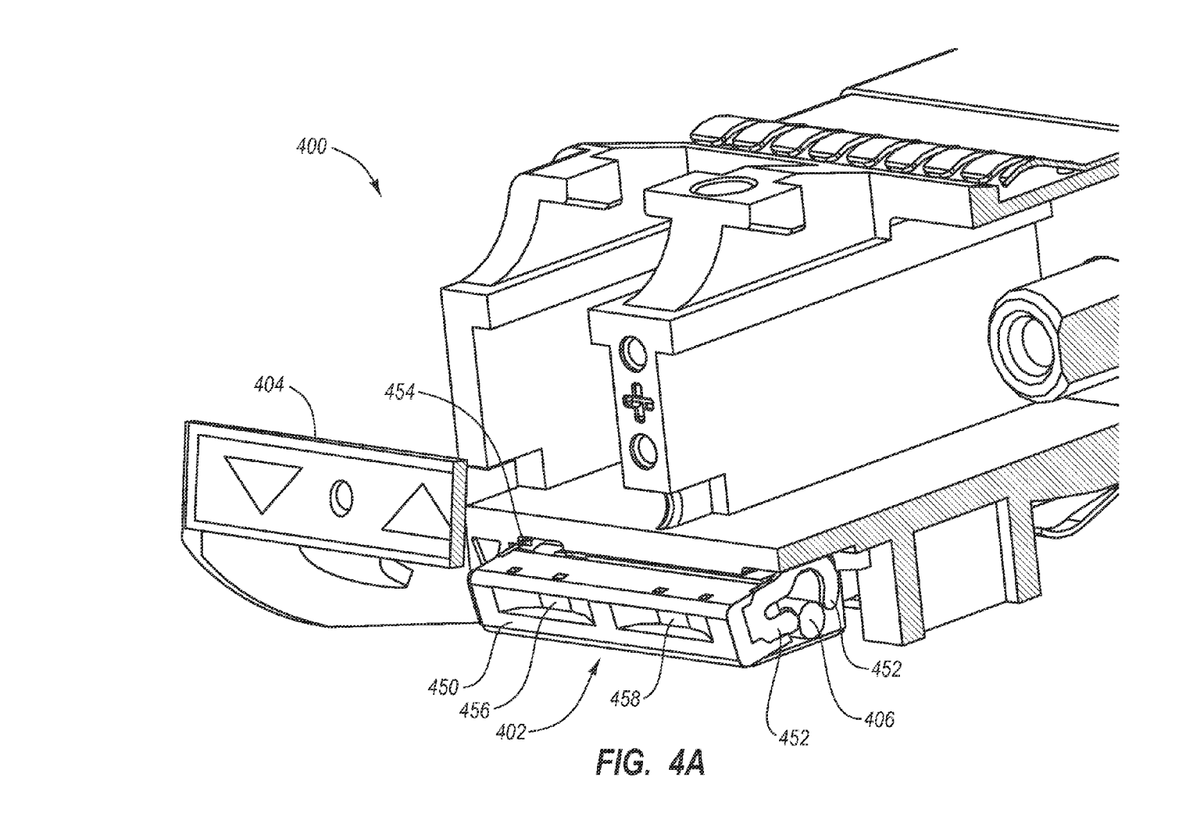
FIGS. 4A and 4B illustrate perspective cross-sectional views of an example optoelectronic transceiver module prior to and after having an identification device coupled thereto.
Figure 4B:
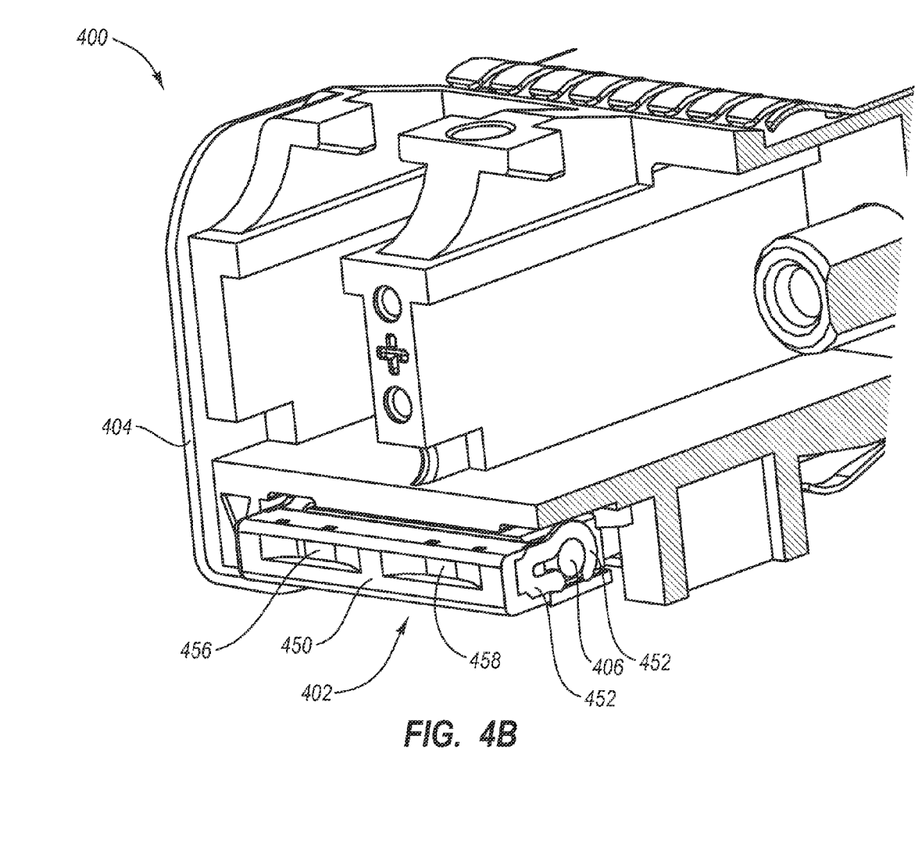

Turning now to FIGS. 4A and 4B, a front perspective cross-sectional view along the length of a transceiver module 400 is illustrated, further depicting the coupling of an identification device 450 to a latch 402 of the transceiver module 400. The transceiver module 400 and identification device 450 may correspond, respectively, to the transceiver module 200 of FIG. 2, and the identification device 250, 300 of FIGS. 2-3C.

The transceiver 400 includes a latch 402 and a bail 404, which function together to removably secure the transceiver module 400 within a cage. FIG. 4A illustrates the bail 404 in an open position and FIG. 4B illustrates the bail 404 in a closed position. As disclosed in the '090 patent referenced above, opening the bail 404 causes the front of the latch 402 to pivot downwards with respect to the transceiver module 400.

In the embodiment shown, the downward displacement of the latch 402 in the open position of FIG. 4A allows the identification device 450 to be coupled to the latch 402. In particular, the latch 402 includes a plurality of posts 406, 408 (only 406 is visible), with one post on each side of the latch 402. The posts are of a size that is complementary to clips 452, 454 of the identification device 450. The clips 452, 454 may be made of a semi-flexible material that flexes slightly when the identification device is positioned as shown in FIG. 4A and a downward force is applied to the identification device with respect to the latch 402. When the applied downward force is sufficient, the clips 452, 454 open wide enough to pass over and engage the posts 406, 408, such that the identification device "snaps" into the position illustrated in FIG. 4B, with the clips 452, 454 securing the identification device 450 to the latch 402 (and to the transceiver module 400).

In the arrangement shown in FIGS. 4A and 4B, identification information can be collected by an external identification system from the identification device 450 in any of a number of ways. For instance, a handheld device with appropriately arranged and configured contacts may be communicably coupled to the contacts 456, 458 of the identification device 450. Once communicably coupled, the handheld device may read the identification information from the identification device 450.

Alternately or additionally, the identification device 450 may further include an antenna coupled to the integrated circuit (not shown). In this embodiment, incoming radio frequency signals from a network device may induce an electrical current in the antenna, providing enough power to the integrated circuit to power up and transmit its unique identification information back to the network device via the antenna or via contacts 456, 458. In this embodiment, the identification device 450 may include contacts 456, 458 configured to be communicably coupled to the outside identification system. Alternately or additionally, the identification device 450 may lack contacts as the antenna in this embodiment allows the identification device to communicate with the outside identification system.

Alternately or additionally, a hardwired connection may couple the identification device 450, via the contacts 456, 458, to a network device configured to read the unique identification information from the integrated circuit.

Figure 5A:
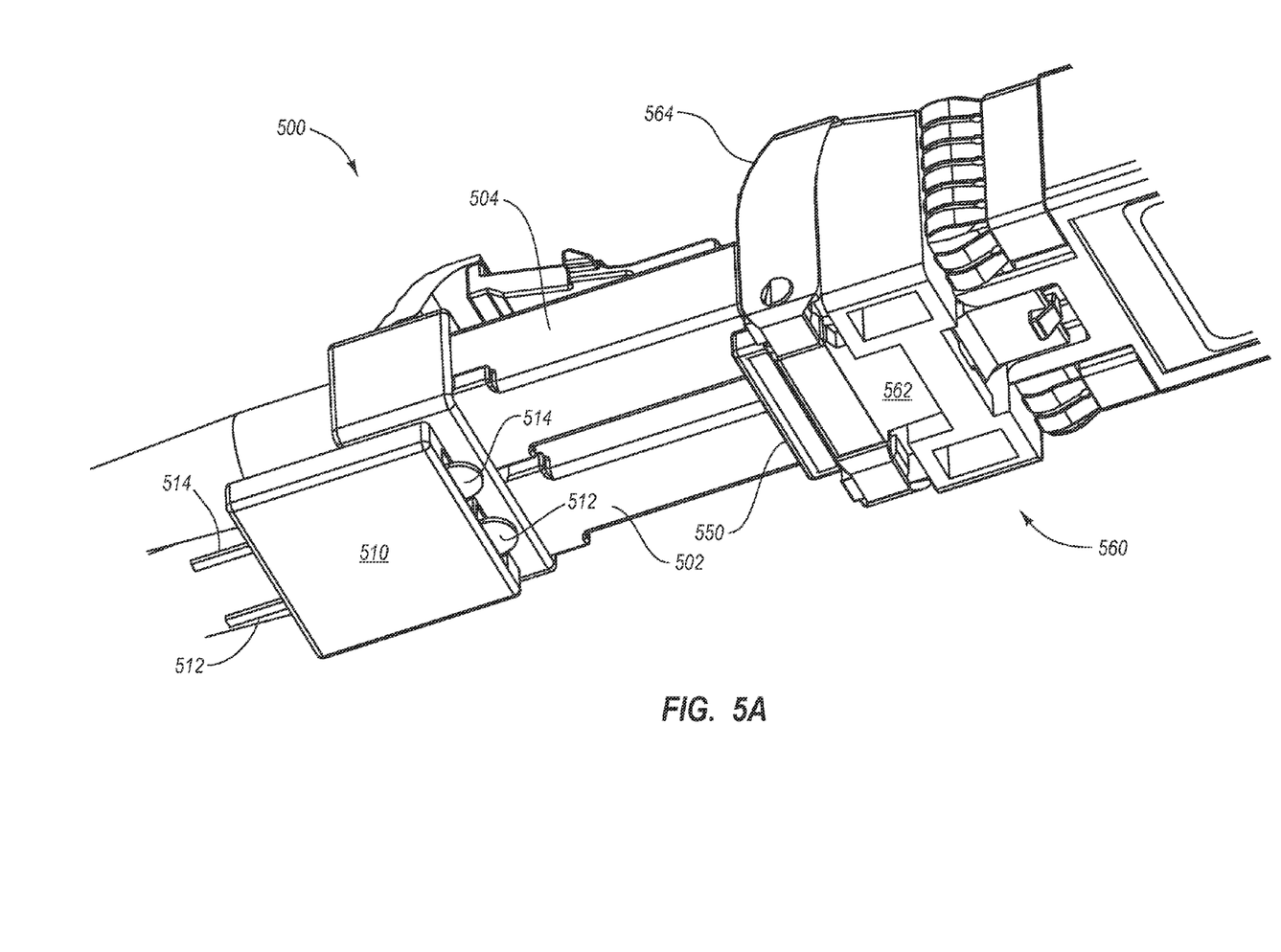
FIGS. 5A and 5B illustrate one embodiment of a connector-coupled device adapted for retrieving unique identification information from an identification device coupled to an optoelectronic device, before and after plugging the connector into the optoelectronic device.
Figure 5B:
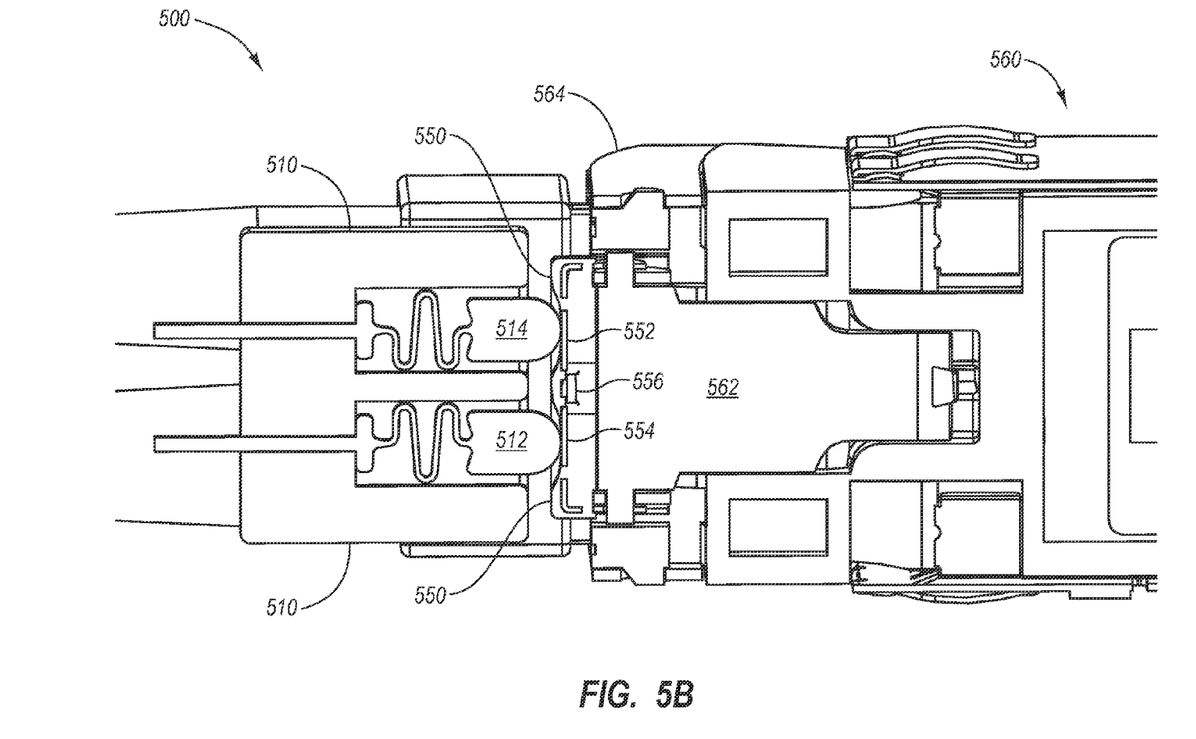

Alternately or additionally, an optical connector configured to be inserted into the optical ports of the transceiver module 400 may include an OOB device that includes or is connected to a wireless transmitter, such as an RFID tag. The OOB device may be configured to read the identification information from the integrated circuit of the identification device 450. For instance, FIGS. 5A and 5B illustrate one embodiment where an optical connector 500 includes or has attached thereto an OOB device 510. The OOB device 510 is configured to be communicably coupled to an identification device 550 which has been coupled to the latch 562 of a transceiver module 560. FIG. 5A illustrates a bottom perspective view of the connector 500 and transceiver 560 prior to insertion, while FIG. 5B illustrates a bottom perspective cross-sectional view of the connector 500 and transceiver 560 after insertion.

The optical connector 500 includes a transmit LC connector 502 and a receive LC connector 504 configured to be received within the output and input ports of the transceiver module 560, respectively. In the illustrated embodiment, the OOB device 510 is coupled to the bottom of the optical connector 500. However, more generally speaking, the OOB device 510 may be positioned on the connector 500 wherever necessary in order to couple or mate with the identification device 550. Thus, if the identification device 550 were coupled to the top of the transceiver module 560, rather than the bottom, the OOB wireless transmitter 510 may similarly be coupled to the top of the optical connector 500, rather than the bottom.

The OOB device 510 includes a plurality of contacts 512, 514. Upon insertion of the connector 500 into the transceiver module 560, each of the contacts 512, 514 is communicably coupled to contacts 552 and 554 of the identification device 550. As described above with respect to FIGS. 3A-3C, each of the contacts 552, 554 is communicably coupled to integrated circuit 556, which includes unique identification information. This configuration enables the OOB device 510 to read and transmit the identification information from identification device 550 to a network device or other network node collecting connectivity and/or identification information. For instance, in operation, incoming radio frequency signals from a network device or other source may induce a current in the antenna of an RFID tag (not shown) coupled to the OOB device 510, providing enough power to supply power to the contacts 512, 514 to read the unique identification information from the identification device 550 (or more particularly, from the integrated circuit 556 of the identification device 550).

Advantageously, embodiments of the invention enable connectivity and/or identification information to be collected from new and/or legacy optoelectronic devices implemented in optical networks with the addition of external identification devices to the optoelectronic devices as described herein. Each identification device may be programmed with unique identification information corresponding to the identification device itself and/or to the optoelectronic device to which it is coupled. The ability to collect connectivity and/or identification information allows network administrators to almost instantaneously obtain the physical layer topology of their network and to precisely pinpoint any optoelectronic device that includes an external identification device.

Furthermore, embodiments of the identification device described herein offer ease of installation. In particular, in some embodiments the identification device may be easily installed in the factory by optoelectronic device manufacturers or in the field by customers or technicians by simply snapping it into place on posts of a corresponding latch. Furthermore, because the identification devices are implemented as add-on components, as opposed to being integrated within the optoelectronic devices, they can be implemented by vendors or customers at their convenience, without necessarily being subjected to a qualification process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An identification device comprising:
   an integrated circuit programmed with unique identification information;
   a plurality of contacts communicably coupled to the integrated circuit and configured to be communicably coupled to an outside identification system to allow the outside identification system to retrieve the unique identification information from the identification device; and
   a plurality of clips configured to mechanically couple the identification device directly to an optoelectronic transceiver or transponder, wherein the plurality of clips are configured to directly engage a plurality of posts of a line side latch on a front of the optoelectronic transceiver or transponder to secure the identification device to the optoelectronic transceiver or transponder, the front of the optoelectronic transceiver or transponder configured to receive an optical connector that terminates an optical fiber.

2. The identification device of claim 1, wherein:
   the outside identification system includes an out-of-band (OOB) device configured to be mechanically coupled to the optical connector; and
   the OOB device includes a wireless transmitter including a radio frequency identification (RFID) tag configured to read the unique identification information from the identification device through the plurality of contacts.

3. The identification device of claim 1, wherein:
   the outside identification system includes an out-of-band (OOB) device configured to be mechanically coupled to the optical connector and to be communicably coupled to the plurality of contacts through direct physical contact with the plurality of contacts;
   the front of the optoelectronic transceiver or transponder includes an optical port configured to receive the optical connector; and
   the plurality of clips of the identification device are configured to mechanically couple the identification device directly to the optoelectronic transceiver or transponder such that the plurality of contacts cannot be in direct physical contact with the OOB device unless the optical connector is properly inserted into the optical port of the optoelectronic transceiver or transponder.

4. The identification device of claim 1, wherein:
   the front of the optoelectronic transceiver or transponder includes an optical port configured to receive the optical connector as it is inserted into the optical port in a sliding direction;
   each of the plurality of contacts has an exposed face configured to be communicably coupled to the outside identification system; and
   the exposed face of each of the plurality of contacts is substantially normal to the sliding direction.

5. The identification device of claim 1, further comprising a frame configured to provide structural support for the identification device, an overmolded body molded over the frame and the plurality of contacts and including a cavity for receiving the integrated circuit, and epoxy configured to secure the integrated circuit within the cavity of the overmolded body.

6. The identification device of claim 1, wherein the unique identification information uniquely identifies the identification device, the optoelectronic transceiver or transponder, or both.

7. The identification device of claim 1, wherein the outside identification system includes one or more of:
   a hardwired connection communicably coupling the plurality of contacts to a network device of the outside identification system;
   a handheld device;
   a communication device mechanically coupled to the optical connector; and
   a radio frequency identification (RFID) tag.

8. The identification device of claim 1, wherein the optoelectronic transceiver or transponder includes an enhanced small form-factor pluggable (SFP+) transceiver.

9. A system to provide connectivity information, the system comprising:
   an identification device that includes:
      an integrated circuit programmed with unique identification information;
      a first plurality of contacts communicably coupled to the integrated circuit and configured to be communicably coupled to an outside identification system to allow the outside identification system to retrieve the unique identification information from the identification device; and
      a plurality of clips configured to mechanically couple the identification device directly to an optoelectronic transceiver or transponder, wherein the plurality of clips are configured to directly engage a plurality of posts of a line side latch on a front of the optoelectronic transceiver or transponder to secure the identification device to the optoelectronic transceiver or transponder, the front of the optoelectronic transceiver or transponder configured to receive an optical connector that terminates an optical fiber; and
   an out-of-band (OOB) device that includes:
      a radio frequency identification (RFID) tag;
      a second plurality of contacts electrically coupled to the RFID tag and configured to communicably couple the OOB device to the identification device; and
      a housing within which each of the second plurality of contacts is at least partially disposed, the housing configured to be mechanically coupled to the optical connector that terminates the optical fiber.

10. The system of claim 9, wherein:
    the front of the optoelectronic transceiver or transponder includes an optical port configured to receive the optical connector as it is inserted into the optical port in a sliding direction;

each of the first plurality of contacts of the identification device has an exposed face configured to be communicably coupled to the outside identification system; and the exposed face of each of the first plurality of contacts is substantially normal to the sliding direction.

11. The system of claim 9, wherein the identification device further includes a frame configured to provide structural support for the identification device, an overmolded body molded over the frame and the first plurality of contacts and including a cavity within which the integrated circuit is positioned, and epoxy configured to secure the integrated circuit within the cavity of the overmolded body.

12. The system of claim 9, wherein the unique identification information uniquely identifies the identification device, the optoelectronic transceiver or transponder, or both.

13. The system of claim 9, wherein the optical connector comprises a Lucent or local connector (LC), a ferrule connector (FC), or a subscriber or standard connector (SC) an LC connector, an FC connector, or an SC connector.

14. The system of claim 9, wherein the housing is configured to be mechanically coupled to the optical connector such that the plurality of contacts cannot be communicably coupled to the identification device unless the optical connector is properly inserted into the optical port of the optoelectronic transceiver or transponder.

15. The system of claim 9, wherein the RFID tag includes an antenna and is configured to:
   receive unique identification information of the identification device through the plurality of contacts; and
   transmit the unique identification information of the identification device to a network device of the outside identification system through the antenna.

16. The system of claim 9, wherein the RFID tag is configured to transmit, to a network device of the outside identification system, information indicating that the OOB device is connected to the identification device.

17. The system of claim 9, wherein the RFID tag includes an antenna and is configured to:
   receive operating parameters of the optoelectronic transceiver or transponder from the identification device through the plurality of contacts; and
   transmit the operating parameters of the optoelectronic transceiver or transponder to a network device of the outside identification system through the antenna.

18. The system of claim 9, wherein the RFID tag includes an integrated circuit and is configured to transmit unique identification information of the OOB device stored on the integrated circuit to a network device of the outside identification system.

* * * * *